(12) United States Patent  
Morikawa

(10) Patent No.: US 11,743,413 B2  
(45) Date of Patent: Aug. 29, 2023

(54) NON-TRANSITORY COMPUTER-READABLE MEDIUM STORING COMPUTER-READABLE INSTRUCTIONS, COLOR SETTING METHOD, AND COLOR SETTING DEVICE

(71) Applicant: BROTHER KOGYO KABUSHIKI KAISHA, Nagoya (JP)

(72) Inventor: Shota Morikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/682,170

(22) Filed: Feb. 28, 2022

(65) Prior Publication Data  
US 2022/0321739 A1 Oct. 6, 2022

(30) Foreign Application Priority Data  
Mar. 31, 2021 (JP) ................. 2021-060860

(51) Int. Cl.  
*H04N 1/60* (2006.01)

(52) U.S. Cl.  
CPC ........... *H04N 1/605* (2013.01); *H04N 1/6008* (2013.01); *H04N 1/6061* (2013.01)

(58) Field of Classification Search  
CPC ..... H04N 1/605; H04N 1/6008; H04N 1/6061  
See application file for complete search history.

(56) References Cited

U.S. PATENT DOCUMENTS

| | | | | |
|---|---|---|---|---|
| 6,519,049 B1 * | 2/2003 | Nagasaka | ............ | H04N 1/0044 358/1.14 |
| 7,961,352 B2 * | 6/2011 | Kaneko | .................... | H04N 1/54 358/1.9 |
| 8,390,886 B2 * | 3/2013 | Willamowski | ..... | H04N 1/32122 358/1.9 |
| 9,244,634 B2 * | 1/2016 | Ebuchi | .................. | G06F 3/1205 |

(Continued)

FOREIGN PATENT DOCUMENTS

JP 2006270517 A * 10/2006  
JP 2006270517 A 10/2006

OTHER PUBLICATIONS

Office Action issued in related U.S. Appl. No. 17/682,170, dated Nov. 25, 2022. (16 pages.).

(Continued)

*Primary Examiner* — Ted W Barnes  
(74) *Attorney, Agent, or Firm* — K&L Gates LLP

(57) ABSTRACT

A non-transitory computer-readable medium stores computer-readable instructions. The instructions instruct a computer to perform processes including an acquisition step, a determination step, and a display step. The acquisition step includes acquiring a specified color. The determination step includes determining whether a device-independent color based on the specified color is present within a first color gamut based on first print settings of a printer. The display step includes displaying, when it is determined by the determination step that the device-independent color is present within the first color gamut, second print settings of the printer. The second print settings are different from the first print settings and with which the device-independent color is present within a second color gamut that is based on the second print settings.

13 Claims, 7 Drawing Sheets

(56) References Cited

U.S. PATENT DOCUMENTS

| | | | | |
|---|---|---|---|---|
| 11,489,977 B1* | 11/2022 | Izumisawa | | G06F 3/0482 |
| 2002/0163669 A1* | 11/2002 | Yamazaki | | H04N 1/6058 |
| | | | | 358/1.9 |
| 2005/0024662 A1* | 2/2005 | Yamada | | H04N 1/6058 |
| | | | | 358/1.9 |
| 2009/0296152 A1* | 12/2009 | Mestha | | H04N 1/6033 |
| | | | | 358/2.1 |
| 2009/0316165 A1* | 12/2009 | Mestha | | H04N 1/6058 |
| | | | | 358/1.9 |
| 2011/0058192 A1* | 3/2011 | Hatanaka | | H04N 1/54 |
| | | | | 358/1.9 |
| 2011/0069332 A1* | 3/2011 | Katayama | | H04N 1/6058 |
| | | | | 358/1.9 |
| 2011/0080600 A1* | 4/2011 | Hibi | | H04N 1/54 |
| | | | | 358/1.9 |
| 2011/0141497 A1* | 6/2011 | Willamowski | | H04N 1/603 |
| | | | | 358/1.9 |
| 2011/0310411 A1* | 12/2011 | Hirano | | H04N 1/6058 |
| | | | | 358/1.9 |
| 2012/0176632 A1* | 7/2012 | Katano | | G06F 3/1208 |
| | | | | 358/1.9 |
| 2012/0218574 A1* | 8/2012 | Fukuda | | H04N 1/6033 |
| | | | | 358/1.9 |
| 2013/0135683 A1* | 5/2013 | Sawada | | G06K 15/1878 |
| | | | | 358/2.1 |
| 2015/0098650 A1* | 4/2015 | Atkins | | G06T 5/007 |
| | | | | 382/167 |
| 2016/0234402 A1* | 8/2016 | Yamaguchi | | H04N 1/603 |
| 2017/0339315 A1* | 11/2017 | Robinson | | H04N 1/54 |
| 2018/0063382 A1* | 3/2018 | Tanaka | | H04N 1/6008 |
| 2019/0037111 A1* | 1/2019 | Ezoe | | H04N 1/6008 |
| 2019/0260911 A1* | 8/2019 | Toriyabe | | H04N 1/6008 |
| 2020/0039234 A1* | 2/2020 | Arakane | | B41J 19/147 |
| 2020/0369024 A1* | 11/2020 | Williams | | H04N 1/603 |
| 2022/0070335 A1* | 3/2022 | Matsushima | | H04N 1/6022 |
| 2022/0256055 A1* | 8/2022 | Matsuda | | H04N 1/00482 |
| 2022/0256056 A1* | 8/2022 | Takasaki | | H04N 1/00469 |

OTHER PUBLICATIONS

Office Action issued in related U.S. Appl. No. 17/682,154, dated Nov. 9, 2022. (17 pages.).

* cited by examiner

FIG. 5

| COLOR GAMUT TABLE |||||
|---|---|---|---|---|
| COLOR GAMUT | PRINT SETTING || PRINT TIME | PRINT COST |
| | RESOLUTION | BASE INK | | |
| COLOR GAMUT C1 | LOW RESOLUTION | NO BASE | PT1 | PC1 |
| COLOR GAMUT C2 | LOW RESOLUTION | SMALL AMOUNT | PT2 | PC2 |
| COLOR GAMUT C3 | LOW RESOLUTION | HIGH AMOUNT | PT3 | PC3 |
| COLOR GAMUT C4 | HIGH RESOLUTION | NO BASE | PT4 | PC4 |
| COLOR GAMUT C5 | HIGH RESOLUTION | SMALL AMOUNT | PT5 | PC5 |
| COLOR GAMUT C6 | HIGH RESOLUTION | HIGH AMOUNT | PT6 | PC6 |

NON-TRANSITORY COMPUTER-READABLE MEDIUM STORING COMPUTER-READABLE INSTRUCTIONS, COLOR SETTING METHOD, AND COLOR SETTING DEVICE

CROSS-REFERENCE TO RELATED APPLICATIONS

This application claims priority to Japanese Patent Application No. 2021-060860 filed Mar. 31, 2021. The contents of the foregoing application are hereby incorporated herein by reference.

BACKGROUND

The present disclosure relates to a non-transitory computer-readable medium storing computer-readable instructions, a color setting method, and a color setting device.

In an image processing method, an editing device acquires a specified color. The editing device determines whether a device-independent color that is based on the specified color is present in a color gamut of a printer. When the specified color-based device-independent color is present in the color gamut of the printer, the editing device registers the specified color without updating the specified color.

SUMMARY

In the above-described image processing method, the color gamut of the printer is prescribed by print settings of the printer. For example, there is a case in which the specified color-based device-independent color is present in the color gamut of the printer even when the print settings of the printer are changed. Even in this case, in the above-described image processing method, there is a possibility that options for alternative print settings of the printer are not presented to a user.

Embodiments of the broad principles derived herein provide a non-transitory computer-readable medium storing computer-readable instructions, a color setting method, and a color setting device that can present a user with options for alternative print settings of a printer, while suppressing a print color from becoming distant from a specified color.

A first aspect of the present disclosure relates to a non-transitory computer-readable medium storing computer-readable instructions. The instructions, when executed by a processor of a computer, instruct the computer to perform processes including an acquisition step, a determination step, and a display step. The acquisition step includes acquiring a specified color. The determination step includes determining whether a device-independent color that is based on the specified color acquired by the acquisition step is present within a first color gamut that is based on first print settings of a printer. The display step includes displaying, when it is determined by the determination step that the device-independent color is present within the first color gamut, second print settings of the printer. The second print settings are different from the first print settings and with which the device-independent color is present within a second color gamut that is based on the second print settings.

According to the first aspect, the non-transitory computer-readable medium storing computer-readable instructions displays the second print settings in the display step. In this way, the non-transitory computer-readable medium storing computer-readable instructions can provide a user with options for the second print settings as an alternative to the first print settings. Since the device-independent color that is based on the specified color is present in the second color gamut that is based on the second print settings, even with the second print settings, a print color is suppressed from becoming distant from the specified color. Thus, the non-transitory computer-readable medium storing computer-readable instructions can provide the user with options for the second print settings as an alternative to the first print settings, while suppressing the print color from becoming distant from the specified color.

A second aspect of the present disclosure relates to a color setting method. The color setting method includes an acquisition step, a determination step, and a display step. The acquisition step includes acquiring a specified color. The determination step includes determining whether a device-independent color that is based on the specified color acquired by the acquisition step is present within a first color gamut that is based on first print settings of a printer. The display step includes displaying, when it is determined by the determination step that the device-independent color is present within the first color gamut, second print settings of the printer. The second print settings are different from the first print settings and with which the device-independent color is present within a second color gamut that is based on the second print settings.

The second aspect can achieve the same effects as those of the first aspect.

A third aspect of the present disclosure relates to a color setting device. The color setting device includes a processor and a memory. The memory stores computer-readable instructions that, when executed by the processor, instruct the processor to perform processes. The processes include acquisition processing, determination processing, and display processing. The acquisition processing includes acquiring a specified color. The determination processing includes determining whether a device-independent color that is based on the specified color acquired by the acquisition processing is present within a first color gamut that is based on first print settings of a printer. The display processing includes displaying, when it is determined by the determination processing that the device-independent color is present within the first color gamut, second print settings of the printer. The second print settings are different from the first print settings and with which the device-independent color is present within a second color gamut that is based on the second print settings.

The third aspect can achieve the same effects as those of the first aspect.

BRIEF DESCRIPTION OF THE DRAWINGS

Embodiments will be described below in detail with reference to the accompanying drawings in which:

FIG. 5 is a perspective view showing an example of a color gamut table;

DETAILED DESCRIPTION

Figure 1:
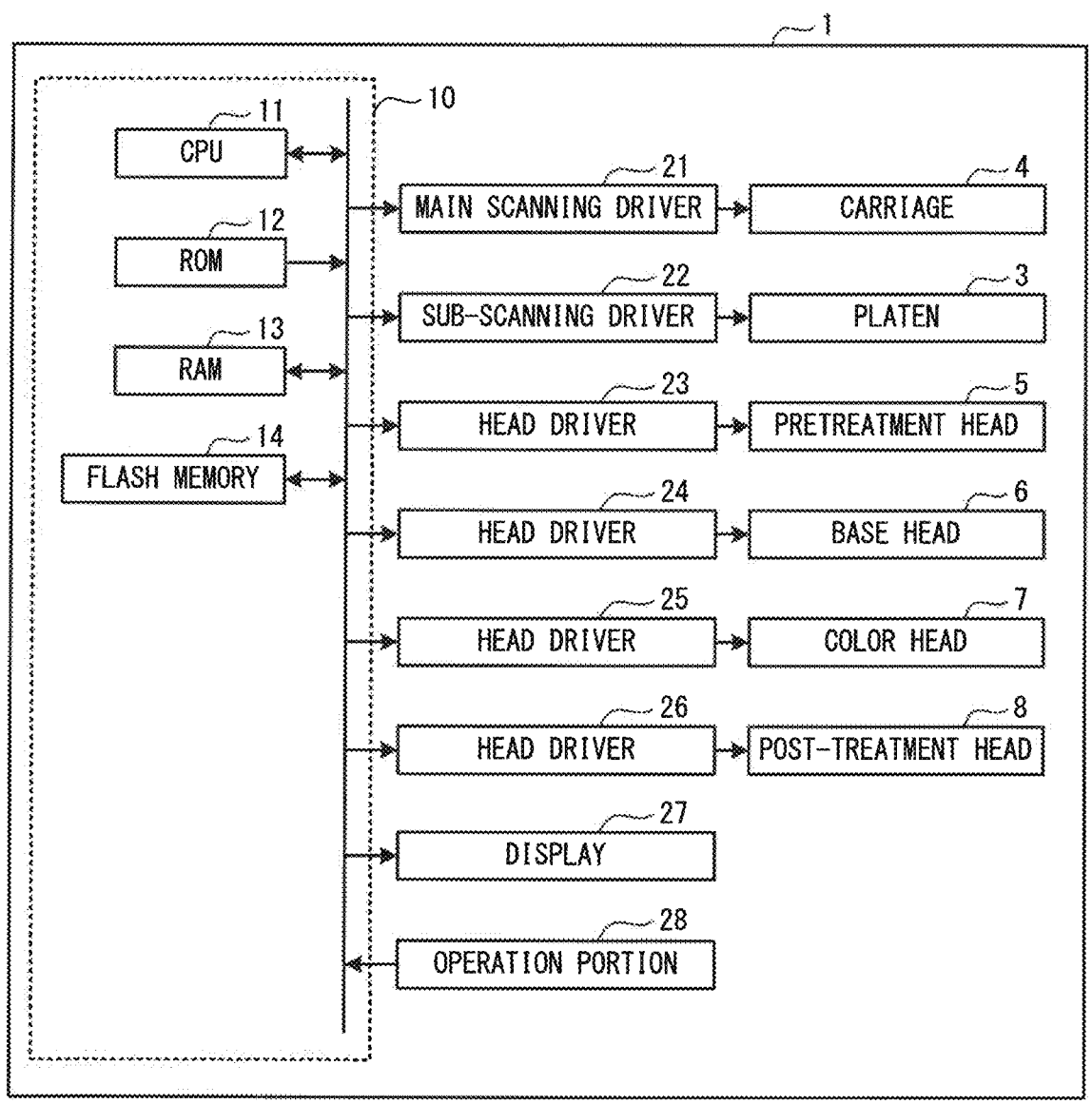
FIG. 1 is a block diagram showing an electrical configuration of a printer.

A printer 1 according to a first embodiment of the present disclosure will be explained with reference to the drawings.

In the printer 1 shown in FIG. 1, colors to be printed can be set in accordance with an input operation on an operation portion 28 to be described later. The printer 1 creates print data on the basis of the set colors. The printer 1 performs printing on a print medium on the basis of the created print data. The print medium is fabric, paper, or the like, and is a T-shirt, for example.

In the following explanation, an up-down direction, a main scanning direction, and a sub-scanning direction that are orthogonal to each other are used. White (W) ink is referred to as "white ink". When black (K), yellow (Y), cyan (C), and magenta (M) inks are collectively referred to, they are referred to as "color inks". When the white ink and the color inks are collectively referred to, they are referred to as "ink".

The printer 1 is an inkjet printer, for example, and is provided with a platen 3, a carriage 4, a pretreatment head 5, a base head 6, a color head 7, and a post-treatment head 8. The platen 3 can move in the sub-scanning direction as a result of driving of a sub-scanning driver 22, and supports the print medium. The carriage 4 is provided above the platen 3, and can move in the main scanning direction as a result of driving of a main scanning driver 21.

The pretreatment head 5, the base head 6, the color head 7, and the post-treatment head 8 are installed on the carriage 4. The pretreatment head 5 discharges a pretreatment agent onto the print medium on the platen 3, as a result of driving of a head driver 23. The pretreatment agent is a type of base agent, and is, for example, a base coat solution. The pretreatment agent is an aqueous solution that includes a cationic polymer or a multivalent metal salt, for example. The pretreatment agent is applied to the print medium before second pretreatment processing to be described later, and improves fixing of a base to the print medium, and color development of the color inks. Hereinafter, processing in which the printer 1 applies the pretreatment agent to the print medium is referred to as "first pretreatment processing".

The base head 6 discharges a base ink onto the print medium on the platen 3 as a result of driving of a head driver 24. The base ink is a type of base agent, and forms the base on the print medium, before print processing to be described later, in order to improve the color development of the color inks. The base ink is not limited to an ink of a particular color, and is the white ink, for example. Hereinafter, processing in which the printer 1 forms the base on the print medium using the base ink is referred to as the "second pretreatment processing". Note that the white ink may also be used in the print processing to be described later.

The color head 7 discharges the color inks onto the print medium on the platen 3 as a result of driving of a head driver 25. The color inks are discharged directly onto the print medium, or onto the base, and form a print image on the print medium. Hereinafter, processing in which the printer 1 prints the print image on the print medium using the color inks is referred to as the "print processing".

The post-treatment head 8 discharges a post-treatment agent onto the print medium on the platen 3 as a result of driving of a head driver 26. The post-treatment agent is a coating agent, and is applied on the print image after the print processing. The post-treatment agent protects the print image and improves glossiness of the print image. The post-treatment agent is an aqueous solution that includes a resin emulsion or a crosslinking agent, for example. Hereinafter, processing in which the printer 1 applies the post-treatment agent to the print medium is referred to as "post-treatment processing".

According to the configuration of the above-described printer 1, the printer 1 moves each of the heads relative to the print medium on the platen 3 in the sub-scanning direction and the main scanning direction, by conveying the carriage 4 in the main scanning direction and conveying the platen 3 in the sub-scanning direction. The printer 1 performs the first pretreatment processing, the second pretreatment processing, the print processing, or the post-treatment processing, by discharging the pretreatment agent, the base ink, the color inks, or the post-treatment agent from each of the heads while moving each of the heads relative to the print medium on the platen 3 in the main scanning direction and the sub-scanning direction.

The printer 1 is provided with a control board 10. A CPU 11, a ROM 12, a RAM 13, and a flash memory 14 are provided on the control board 10. The CPU 11 is electrically connected to the ROM 12, the RAM 13, and the flash memory 14, and controls the printer 1. The ROM 12 stores a control program used by the CPU 11 for controlling operations of the printer 1, information necessary for the CPU 11 when executing various programs, and the like. The RAM 13 temporarily stores various data and the like used by the control program. The flash memory 14 is non-volatile, and stores print settings, a color gamut table, print data for performing the printing on the print medium, and the like, to be described later.

The CPU 11 is electrically connected to the main scanning driver 21, the sub-scanning driver 22, the head drivers 23 to 26, a display 27, and the operation portion 28. The main scanning driver 21, the sub-scanning driver 22, and the head drivers 23 to 26 are driven under control by the CPU 11.

The display 27 displays various information under control by the CPU 11, and displays a color setting screen 30 (refer to FIG. 3 and FIG. 4) to be described later, for example. The operation portion 28 is a touch panel, a keyboard, and the like. The operation portion 28 is operated by a user and outputs a signal, to the CPU 11, in accordance with an operation. By operating the operation portion 28, the user can input, to the printer 1, a color setting command for performing color setting, or a print command for starting the printing, for example.

An example of print settings will be explained. The print settings are settings relating to the printing by the printer 1. The print settings of the present embodiment are divided into three types, of print control settings, print medium settings, and ink settings. The print control settings relate to the control of the printer 1. The printer 1 controls the printing on the basis of the print control settings.

The print control settings include, for example, each of settings for a resolution of the print image, processing conditions of the first pretreatment processing, processing conditions of the second pretreatment processing, processing conditions of the post-treatment processing, a print direction, an image quality adjustment value, an interlace value, a print time, a concentration of the black ink, a type of the printer 1, a temperature inside the printer 1, humidity inside the printer 1, an illumination environment inside the printer 1, print costs by the printer 1, and an output profile. For example, the resolution of the print image is a resolution when the color inks are discharged.

As the processing conditions of the first pretreatment processing, the printer 1 can set whether or not to perform the first pretreatment processing, for example. When the first pretreatment processing is to be performed, the printer 1 can set, as the processing conditions of the first pretreatment processing, for example, a method of the first pretreatment processing, an amount of the pretreatment agent, and a concentration of the pretreatment agent. Furthermore, the printer 1 may set a resolution when discharging the pretreatment agent.

As the processing conditions of the second pretreatment processing, the printer 1 can set whether or not to perform the second pretreatment processing, for example. When the second pretreatment processing is to be performed, the printer 1 can set, for example, an amount of the base ink, and a type of color of the base ink. Furthermore, the printer 1 may set a resolution when discharging the base ink. As the processing conditions of the post-treatment processing, the printer 1 can set whether or not to perform the post-treatment processing, for example. When the post-treatment processing is to be performed, the printer 1 can set, as the processing conditions, of the post-treatment processing, for example, a method of the post-treatment processing, an amount of the post-treatment agent, and a concentration of the post-treatment agent. Furthermore, the printer 1 may set a resolution when discharging the post-treatment agent.

The print medium settings relate to the print medium on which the printing is to be performed by the printer 1. In the printing by the printer 1, the print medium based on the print medium settings is used. The print medium settings include each of settings for a color of the print medium and a material of the print medium, for example.

The ink settings relate to the inks used in the printing by the printer 1. In the printing by the printer 1, the inks based on the ink settings are used. The ink settings include each of settings for a type of color of the ink and an amount of the ink to be used in the printing, for example.

In the present embodiment, in addition to the time from the start to the end of the print processing, the print time by the printer 1 includes, for example, the time required for the first pretreatment processing, the second pretreatment processing, and the post-treatment processing. By changing the print settings such that some or all of the first pretreatment processing, the second pretreatment processing, and post-treatment processing are not performed, for example, the printer 1 can reduce the print time by the printer 1.

In addition to costs relating to the print processing, for example, the print costs by the printer 1 include costs relating to the first pretreatment processing, the second pretreatment processing, and the post-treatment processing. The costs include, for example, costs relating to consumables, such as the pretreatment agent, the ink, the post-treatment agent, and the like, and to power consumption costs relating to each of the processing. By changing the print settings so as to reduce the amount of pretreatment agent, the amount of base ink, and the amount of post-treatment agent, the printer 1 can reduce the print costs by the printer 1.

A color gamut of the printer 1 will be explained. The color gamut of the printer 1 is a color range that the printer 1 can reproduce through printing, and may change in accordance with a change in the print settings of the printer 1. Note that a "change in the color gamut" includes both a case in which the shape of the color gamut changes and a case in which a size of the color gamut changes. Hereinafter, the color gamut of the printer 1 is referred to as a "print setting-based color gamut." The print setting-based color gamut is prescribed in an LCh color space, by luminance (L), chroma (C), and hue (h), for example.

For example, when the print control settings are changed, with respect to some or all of the luminance, chroma, and hue, the print setting-based color gamut may expand or may become narrower. More specifically, when the first pretreatment processing is performed, the color development of the color inks is improved, and thus, compared to when the first pretreatment processing is not performed, the luminance, chroma, and hues are likely to expand. In the first pretreatment processing, when the amount of the pretreatment agent increases, the hues expand. When the second pretreatment processing is performed, the color development of the color inks is improved, and thus, compared to when the second pretreatment processing is not performed, the luminance, chroma, and hues are likely to expand. In the second pretreatment processing, when the amount of the base ink increases, the luminance, chroma, and hues are likely to expand. When the post-treatment processing is performed, since the glossiness is enhanced, compared to when the post-treatment processing is not performed, the luminance is likely to be enhanced. In the post-treatment processing, when the amount of the post-treatment agent is increased, the luminance is likely to be enhanced.

When the print medium settings are changed, with respect to some or all of the luminance, chroma, and hues, the print setting-based color gamut may expand or may become narrower. More specifically, when the print medium having relatively high color development properties is used, compared to when the print medium having the relatively low color development properties is used, the luminance, chroma, and hues are likely to expand.

When the ink settings are changed, with respect to some or all of the luminance, chroma, and hues, the print setting-based color gamut may expand or may become narrower. More specifically, when the types of color of the ink increase, the luminance, chroma, and hues are likely to expand.

Main processing will be explained with reference to FIG. 2 to FIG. 10. For example, the user operates the operation portion 28 shown in FIG. 1 and inputs the color setting command to the printer 1. When the color setting command is input, the CPU 11 performs the main processing by reading out and operating the control program from the ROM 12.

Figure 2:
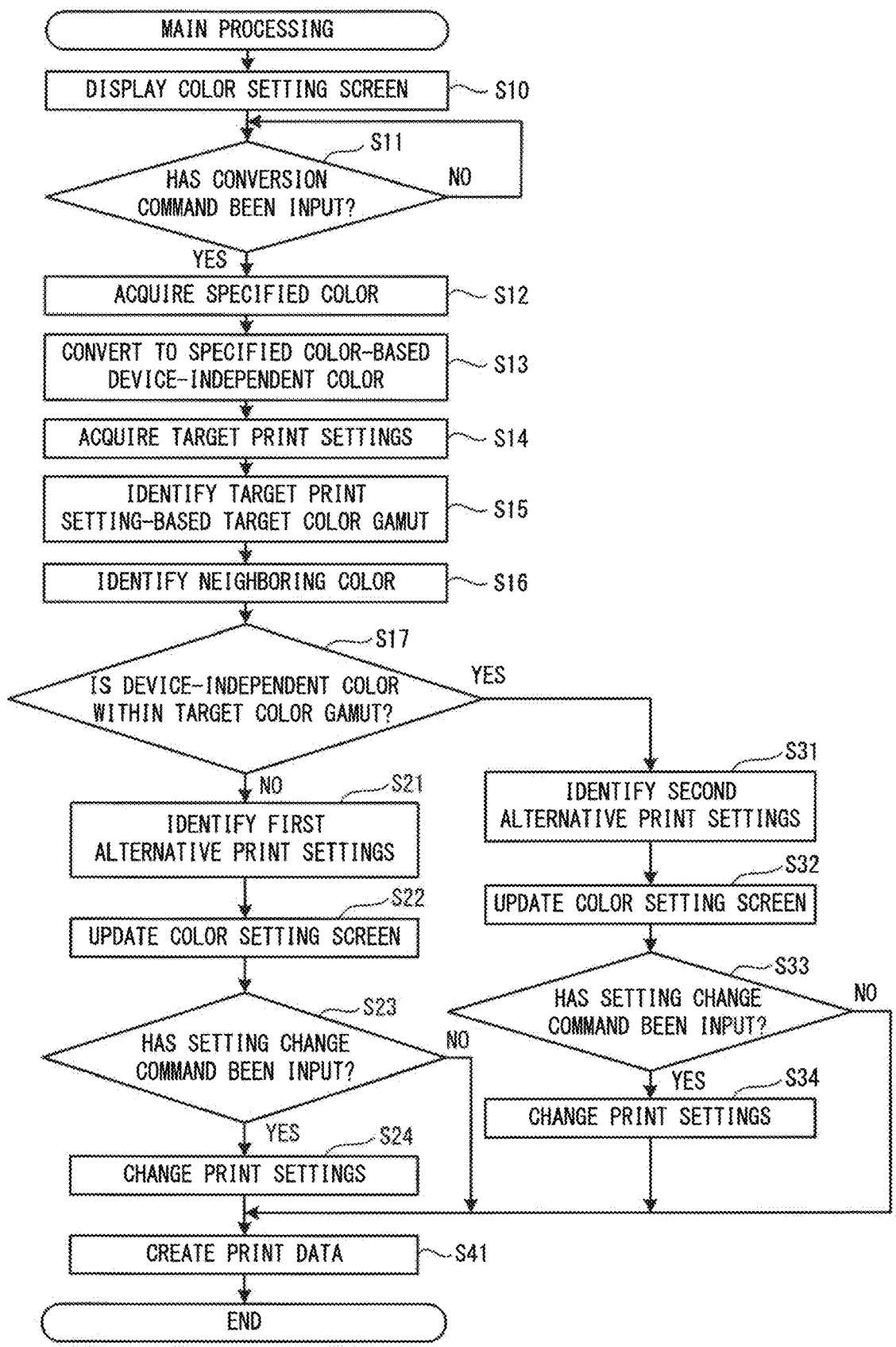
FIG. 2 is a flowchart of main processing.
Figure 3:
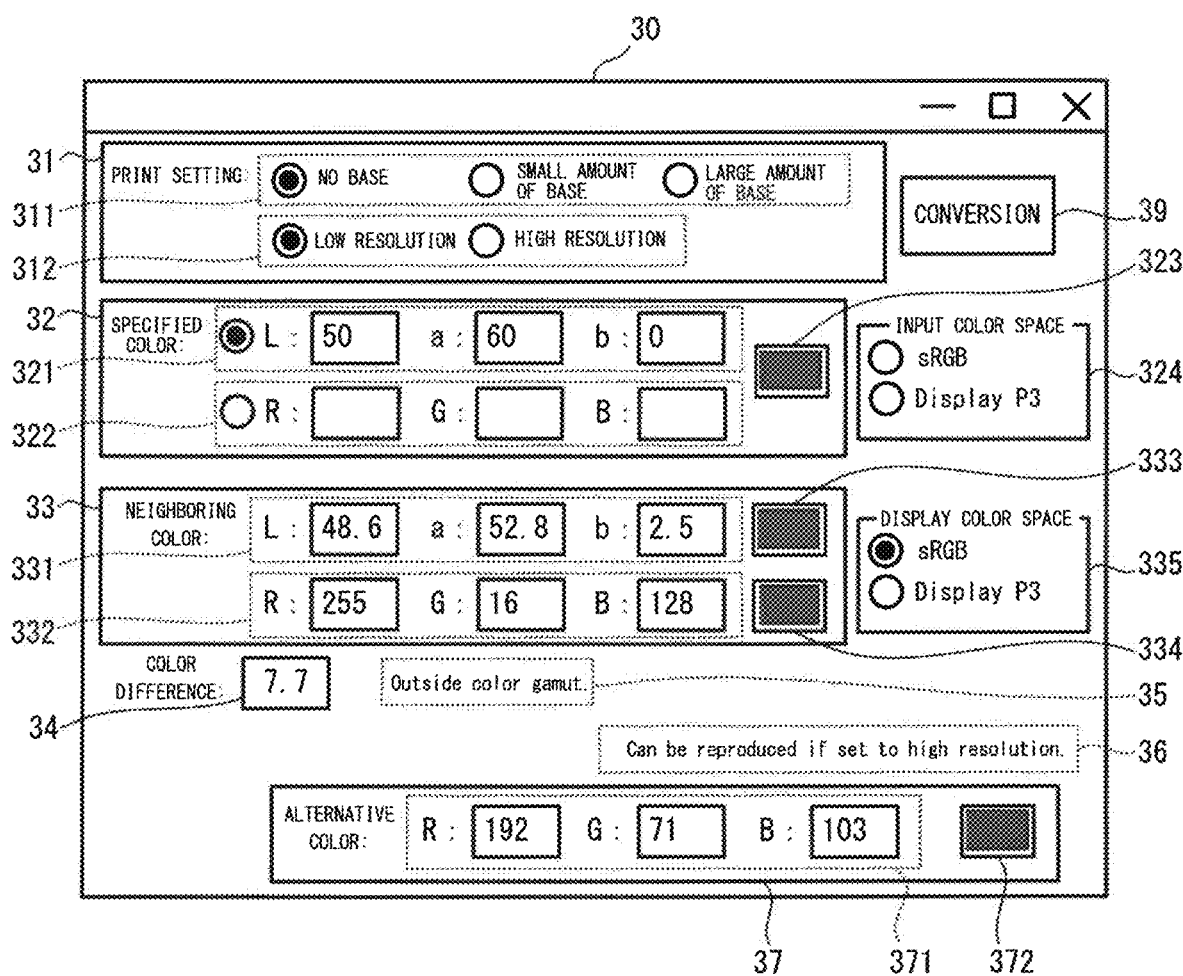
FIG. 3 is a diagram showing an example of a color setting screen.
Figure 4:
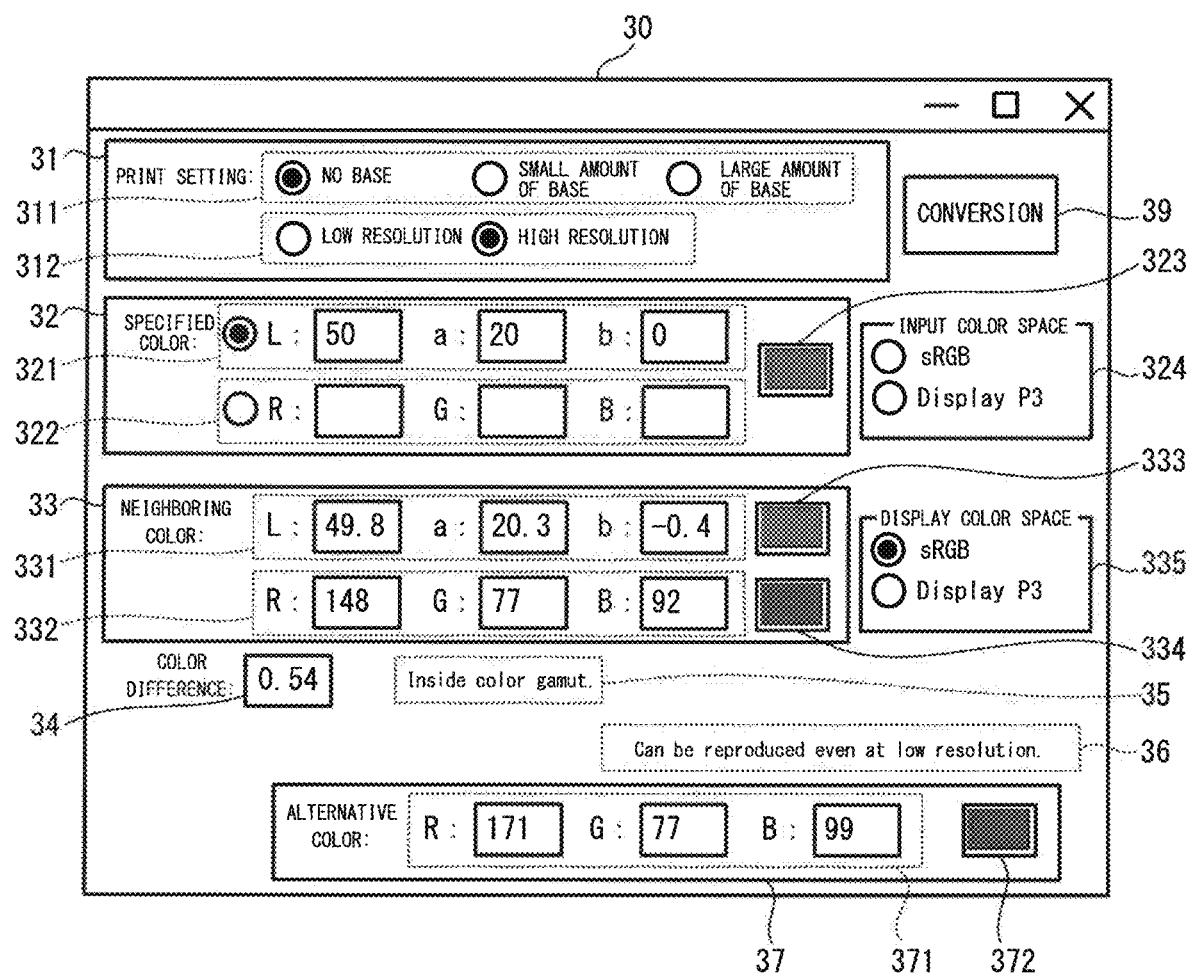
FIG. 4 is a diagram showing an example of the color setting screen.

As shown in FIG. 2, when the main processing is started, the CPU 11 displays, on the display 27 shown in FIG. 1, the color setting screen 30 shown in FIG. 3 and FIG. 4 (step S10). The user operates the operation portion 28 shown in FIG. 1 and performs color setting on the color setting screen 30.

As shown in FIG. 3 and FIG. 4, a print setting selection region 31 is provided in an upper portion of the color setting screen 30. The print setting selection region 31 shows options of the print settings of the printer 1, and includes, for example, an base setting selection region 311 and a resolution selection region 312.

The base setting selection region 311 shows options of processing conditions of the second pretreatment processing, and shows, for example, a "No base" option, a "Small amount of base" option, and a "Large amount of base" option. The "No base" option shows a setting in which the second pretreatment processing is not performed. The "Small amount of base" option shows a setting in which the second pretreatment processing is performed, and shows a setting in which the amount of base ink used in the second pretreatment processing is a small amount. The "Large amount of base" option shows a setting in which the second pretreatment processing is performed, and shows a setting in which the amount of base ink used in the second pretreatment processing is a large amount. The small amount and the large amount are not limited to particular amounts, but the large amount is a larger amount than the small amount.

The resolution selection region 312 shows options of the resolution of the print image, and shows, for example, a "Low resolution" option and a "High resolution" option. The "Low resolution" option shows a setting in which the print image is printed using a low resolution. The "High resolution" option shows a setting in which the print image is printed using a high resolution. The low resolution and the high resolution are not limited to particular resolutions, but the high resolution is a higher resolution than the low resolution.

The user operates the operation portion 28 and selects one of the "No base" option, the "Small amount of base" option, or the "Large amount of base" option in the base setting selection region 311. The user operates the operation portion 28 and selects one of the "Low resolution" option or the "High resolution" option in the resolution selection region 312. Hereinafter, the print settings selected in the base setting selection region 311 and the resolution selection region 312 are referred to as "target print settings." In other words, the target print settings are the print settings that are currently selected.

FIG. 3 shows, as an example, a state in which the "No base" option is selected in the base setting selection region 311, and the "Low resolution" option is selected in the resolution selection region 312. FIG. 4 shows, as an example, a state in which the "No base" option is selected in the base setting selection region 311, and the "High resolution" option is selected in the resolution selection region 312.

On the color setting screen 30, a specified color input region 32 is provided below the print setting selection region 31. The specified color input region 32 shows a specified color, and includes, for example, a Lab input region 321, an RGB input region 322, and a specified color-correspondence icon 323. The specified color is a color specified by the user.

The Lab input region 321 shows Lab values as the specified color. The RGB input region 322 shows RGB values as the specified color. The specified color-correspondence icon 323 shows the color corresponding to the input Lab values or RGB values, as the specified color.

The user operates the operation portion 28 and inputs, to the printer 1, a color of a color sample, the RGB values, CMYK values, XYZ values, Luv values, LCh values, the Lab values, a display color of the display 27, an image, and the like, as the specified color. In the present embodiment, the user operates the operation portion 28 and selects one of the Lab input region 321 or the RGB input region 322. The user operates the operation portion 28, and inputs the Lab values in the Lab input region 321 as the specified color, or inputs the RGB values in the RGB input region 322 as the specified color.

FIG. 3 shows, as an example, a state in which the Lab values (50, 60, 0) are input into the Lab input region 321. FIG. 4 shows, as an example, a state in which the Lab values (50, 20, 0) are input into the Lab input region 321.

On the color setting screen 30, an input color space selection region 324 is provided to the right of the specified color input region 32. The input color space selection region 324 shows a type of RGB color space, and shows, for example, an "sRGB" option and a "Display P3" option. In the specified color input region 32, when the RGB values are input to the RGB input region 322 as the specified color, the user operates the operation portion 28 and, in the input color space selection region 324, selects one of the "sRGB" option or the "Display P3" option. The specified color-correspondence icon 323 shows the color corresponding to the RGB values input to the RGB input region 322, in the color space selected on the input color space selection region 324. Note that, in the specified color input region 32, when the Lab values are input in the Lab input region 321 as the specified color, neither the "sRGB" option nor the "Display P3" option is selected in the input color space selection region 324.

On the color setting screen 30, a conversion button 39 is provided above the input color space selection region 324. After selecting the print settings in the print setting selection region 31 and inputting the specified color in the specified color input region 32, the user operates the operation portion 28 and selects the conversion button 39. In this way, a conversion command for performing processing from step S12 to be described later is input to the printer 1.

Note that, at a time point of the processing at step S10, the user has not performed an input operation, a selection operation, or the like with respect to a neighboring color display region 33, a color difference display region 34, a determination result display region 35, an alternative print setting display region 36, and an alternative color display region 37, which will all be described later. In other words, at the time point of the processing at step S10, numerical values, alphabetic characters, and the like are not yet displayed in the neighboring color display region 33, the color difference display region 34, the determination result display region 35, the alternative print setting display region 36, and the alternative color display region 37.

On the color setting screen 30, the neighboring color display region 33 is provided underneath the specified color input region 32. The neighboring color display region 33 displays a neighboring color to be described below, and includes a Lab display region 331, an RGB display region 332, a Lab-correspondence icon 333, and an RGB-correspondence icon 334.

The Lab display region 331 shows Lab values as the neighboring color. The RGB display region 332 shows RGB values as the neighboring color. The Lab-correspondence icon 333 shows a color corresponding to the Lab values of the Lab display region 331, as the neighboring color. The RGB-correspondence icon 334 shows a color corresponding to the RGB values of the RGB display region 332, as the neighboring color.

On the color setting screen 30, a display color space selection region 335 is provided to the right of the neighboring color display region 33. The display color space selection region 335 shows the type of the RGB color space, and shows an "sRGB" option and a "Display P3" option, for example. The user operates the operation portion 28 and, in the display color space selection region 335, selects one of the "sRGB" option or the "Display P3" option. The RGB-correspondence icon 334 shows the color corresponding to the RGB values of the RGB display region 332, in the color space selected in the display color space selection region 335.

On the color setting screen 30, the color difference display region 34 is provided underneath the neighboring color display region 33. The color difference display region 34 shows a color difference between the specified color and the neighboring color. The color difference is $\Delta E$ or $\Delta E00$, for example.

On the color setting screen 30, the determination result display region 35 is provided to the right of the color difference display region 34. The determination result display region 35 shows whether a specified color-based device-independent color is present either outside or within a target print setting-based target color gamut. The device-independent color is a color that is not dependent on characteristics of a device, and is represented by the Lab color space, the XYZ color space, the Luv color space, the LCh color space, and the like. This will be described in more detail later, but in the present embodiment, the specified color is converted to the device-independent color, and a determination is made as to whether the converted specified color (the specified color-based device-independent color) is present either outside or within the target print setting-based target color gamut.

On the color setting screen 30, the alternative print setting display region 36 is provided to the right of and underneath the determination result display region 35. The alternative print setting display region 36 shows first alternative print settings, to be described later, to be used when the specified color-based device-independent color is not present within the target print setting-based target color gamut. The alternative print setting display region 36 shows second alternative print settings, to be described later, that are to be used when the specified color-based device-independent color is present within the target print setting-based target color gamut.

On the color setting screen 30, the alternative color display region 37 is provided underneath the alternative print setting display region 36. The alternative color display region 37 shows a first alternative color or a second alternative color to be described later, and includes, for example, an RGB display region 371 and an RGB-correspondence icon 372.

The RGB display region 371 shows RGB values, as the first alternative color or the second alternative color. The RGB-correspondence icon 372 shows a color corresponding to the RGB values of the RGB display region 371, as the first alternative color or the second alternative color, in the color space selected in the display color space selection region 335.

As shown in FIG. 2, based on whether the conversion button 39 has been selected by the operation of the operation portion 28 by the user, the CPU 11 determines whether the conversion command has been input (step S11). When the conversion command has not been input (no at step S11), the CPU 11 repeats the processing at step S11 until the conversion command is input. When the conversion command has been input (yes at step S11), the CPU 11 acquires the specified color input in the specified color input region 32 (step S12). In the example shown in FIG. 3, the CPU 11 acquires the Lab values (50, 60, 0) as the specified color. In the example shown in FIG. 4, the CPU 11 acquires the Lab values (50, 20, 0) as the specified color.

The CPU 11 converts the specified color to the device-independent color, on the basis of an LUT table, a profile, and the like (step S13). The LUT table and the profile are stored in the flash memory 14, and show a correspondence relationship between the specified color and the device-independent color. In the present embodiment, as an example, the CPU 11 converts the specified color to the color of the Lab color space. The color of the Lab color space is a type of the device-independent color. At step S13, the CPU 11 may convert the specified color, as the device-independent color, to a color of the XYZ color space, the Luv color space, the LCh color space, and the like.

When the RGB values are input to the RGB input region 322 as the specified color, for example, the CPU 11 converts the RGB values to the Lab values. When the Lab values are input to the Lab value input region 321 as the specified color, for example, the CPU 11 may skip the processing at step S13. Hereinafter, the device-independent color converted on the basis of the specified color by the processing at step S13, or the device-independent color acquired as the specified color by the processing at step S12 is referred to as a "specified color-based device-independent color".

The CPU 11 acquires the target print settings selected in the print setting selection region 31 (step S14). In the example shown in FIG. 3, the CPU 11 acquires "No base" and "Low resolution" as the target print settings. In the example shown in FIG. 4, the CPU 11 acquires "No base" and "High resolution" as the target print settings.

The CPU 11 identifies the target print setting-based target color gamut (step S15). For example, the CPU 11 refers to a table, on the basis of the target print settings, and identifies the target print setting-based target color gamut. As an example, the CPU 11 refers to the color gamut table shown in FIG. 5.

As shown in FIG. 5, the color gamut table establishes the print setting-based color gamut in association with the print settings of the printer 1. As an example, the color gamut table determines color gamuts C1 to C6 for respective combinations of, as the type of the print control settings, settings for the resolution of the print image ("Low resolution" or "High resolution") and settings for the base ink ("No base," "Small amount," or "High amount"). The color gamut table shows the color gamuts C1 to C6 in a device-independent color space. In the present embodiment, as an example, the color gamut table shows the color gamuts C1 to C6 in the LCh color space.

For example, for the print-setting based color gamuts, that of the "High resolution" is larger than that of the "Low resolution." Thus, for the print setting-based color gamuts, the color gamut C4 is larger than the color gamut C1, the color gamut C5 is larger than the color gamut C2, and the color gamut C6 is larger than the color gamut C3. For example, for the print-setting based color gamuts, the color gamut when the base ink is the "Small amount" is larger than the color gamut when the base ink is "No base," and the color gamut when the base ink is the "Large amount" is larger than the color gamut when the base ink is the "Small amount." Thus, for the print-setting based color gamuts, the color gamuts become larger in the order of the color gamut C1, the color gamut C2, and the color gamut C3, and become larger in the order of the color gamut C4, the color gamut C5, and the color gamut C6.

In the example shown in FIG. 3, the CPU 11 identifies, as the target print setting-based target color gamut, the color gamut C1 (refer to FIG. 6) corresponding to "No base" and "Low resolution." In the example shown in FIG. 4, the CPU 11 identifies, as the target print setting-based target color gamut, the color gamut C4 (refer to FIG. 6) corresponding to "No base" and "High resolution.".

Furthermore, the color gamut table determines print times PT1 to PT6 and print costs PC1 to PC6 associated with each of the color gamuts C1 to C6. As an example, the length of time becomes longer in the order of the print times PT1, PT4, PT2, PT5, PT3, and PT6. As an example, the costs become higher in the order of PC1, PC4, PC2, PC5, PC3, and PC6.

As shown in FIG. 2, the CPU 11 identifies the neighboring color (step S16). The neighboring color is a color in the target print setting-based target color gamut, and is the color having the smallest distance to the specified color in a state in which some or all of the luminance, chroma and hue are not fixed. By identifying the neighboring color, the CPU 11 can calculate the color difference between the neighboring color and the specified color ($\Delta E$ or $\Delta E00$). The neighboring color includes, for example, the neighboring color of a color difference priority, the neighboring color of a hue priority, the neighboring color of a luminance priority, and the neighboring color of a chroma priority.

The neighboring color of the color difference priority is a color for which a distance with the specified color is smallest in a state in which all of the luminance, chroma, and hue are not fixed. The neighboring color of the hue priority is a color for which the distance with the specified color is smallest in a state in which the hue is fixed. The neighboring color of the luminance priority is a color for which the distance with the specified color is smallest in a state in which the luminance is fixed. The neighboring color of the chroma priority is a color for which the distance with the specified color is smallest in a state in which the chroma is fixed. The CPU 11 identifies, as the neighboring color of the color difference priority, a point at which the distance is smallest to the target print setting-based target color gamut, from the specified color-based device-independent color, in a space whose axis is a factor that is not fixed, of the luminance, chroma, and hue.

The CPU 11 may identify one of or a plurality of each of the neighboring colors, and identifies the neighboring color of the color difference priority, for example. In this case, the factors that are not fixed are the three factors of the luminance, chroma, and hue. Thus, in the three-dimensional space having respective axes of the three factors of luminance, chroma, and hue, the CPU 11 identifies, as the neighboring color of the color difference priority, a point at which the distance from the specified color to the target color gamut is smallest. In the example shown in FIG. 3, the CPU 11 identifies, as the neighboring color of the color difference priority, Lab values (48.6, 52.8, 2.5) and RGB values (255, 16, 128). In the example shown in FIG. 4, the CPU 11 identifies, as the neighboring color of the color difference priority, Lab values (49.8, 20.3, −0.4) and RGB values (148, 77, 92).

As shown in FIG. 2, the CPU 11 determines whether the specified color-based device-independent color is present within the target print setting-based target color gamut (step S17). For example, the CPU 11 convers one or both of the specified color-based device-independent color and the target print setting-based target color gamut, such that the color space of the specified color-based device-independent color is the same color space as the color space of the target print setting-based target color gamut. In this state, the CPU 11 performs the determination at step S17, in accordance with whether or not color values (coordinate values) of the specified color-based device-independent color are present within the target print setting-based target color gamut identified at step S15. When the color values (coordinate values) of the specified color-based device-independent color are present within the target print setting-based target color gamut identified at step S15, the CPU 11 determines that the specified color-based device-independent color is present within the target print setting-based target color gamut. When the color values (coordinate values) of the specified color-based device-independent color are not present within the target print setting-based target color gamut identified at step S15, the CPU 11 determines that the specified color-based device-independent color is not present within the target print setting-based target color gamut.

As described above, the color gamut table of the present embodiment shows the print setting-based color gamut in the LCh color space. Thus, in the example shown in FIG. 3, the CPU 11 converts, as the specified color, the Lab values (50, 60, 0) to LCh values, and determines whether the LCh values after the conversion are present within the color gamut C1 as the target color gamut. In the example shown in FIG. 4, the CPU 11 converts, as the specified color, the Lab values (50, 20, 0) to LCh values, and determines whether the LCh values after the conversion are present within the color gamut C4 as the target color gamut.

As described above, there is a case in which the print setting-based color gamut changes due to a change of the print settings. For example, when the specified color-based device-independent color is not present within the print setting-based color gamut, by changing the print settings and thus changing the color gamut, there is a possibility that the printer 1 can cause the specified color-based device-independent color to move relatively closer to the print setting-based color gamut. On the other hand, for example, when the specified color-based device-independent color is present within the print setting-based color gamut, even when the print settings are changed and the color gamut is thus changed, there is a case in which the specified color-based device-independent color remains present as it is in the print setting-based color gamut. In this case, depending on the content of the print settings, there is a case in which the printer 1 can reduce the printing costs, or can reduce the print time, for example. Thus, as will be described later, the CPU 11 performs display processing of the print settings that differ depending on the determination result at step S17.

As shown in FIG. 2, when the specified color-based device-independent color is not present within the target color gamut (no at step S17), the CPU 11 identifies the first alternative print settings (step S21). The first alternative print settings are print settings that are different from the target print settings. The first alternative print settings are print settings in which a distance between the specified color-based device-independent color and a first alternative print setting-based first alternative color gamut is smaller than a distance between the specified color-based device-independent color and the target print setting-based target color gamut. Note that the distance between the specified color-based device-independent color and the print setting-based color gamut is "zero" when the specified color-based device-independent color is present within the print setting-based color gamut. In the present embodiment, the first alternative print settings are print settings in which the distance between the specified color-based device-independent color and the target print setting-based target color gamut becomes "zero." In other words, the first alternative print settings are print settings in which the specified color-based device-independent color is within the first alternative print setting-based first alternative color gamut.

At step S21, the CPU 11 refers to the color gamut table shown in FIG. 5, and identifies, of the color gamuts C1 to C6, the color gamuts other than the target color gamut. Of the identified plurality of color gamuts, the CPU 11 identifies the color gamut in which the specified color-based device-independent color is present. The CPU 11 identifies, as the first alternative print settings, the print settings corresponding to the identified color gamut (refer to FIG. 5).

Figure 6:
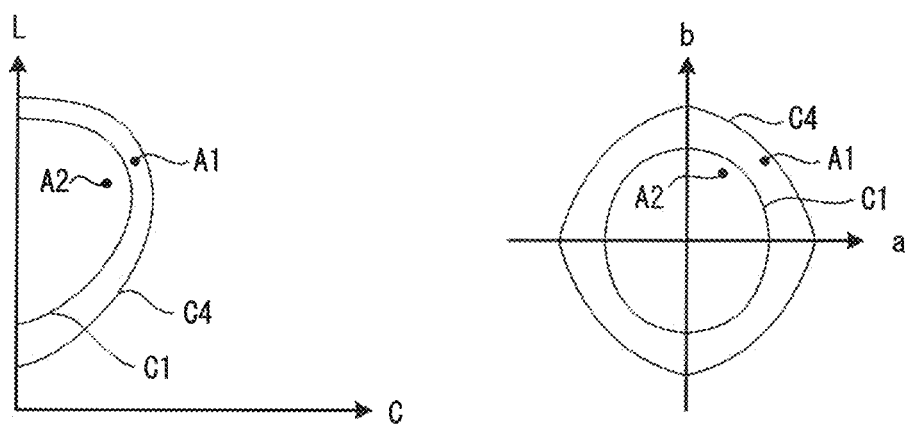
FIG. 6 is a diagram showing a print setting-based color gamut.

FIG. 6 shows the LCh values after converting the Lab values (50, 60, 0) as a point A1. The point A1 is not present within the color gamut C1, and is present within the color gamut C4. Thus, in the example shown in FIG. 3, the CPU 11 identifies, as the first alternative print settings, the print settings corresponding to the color gamut C4 (high resolution and no base ink).

For example, there is a case in which the specified color-based device-independent color is present within a plurality of the color gamuts. In this case, the CPU 11 identifies, as the first alternative print setting-based first alternative color gamut, one color gamut from among the plurality of color gamuts, depending on a priority setting. For example, the user operates the operation portion 28 and sets, on the printer 1, the priority setting that is one of prioritizing the print costs over the print time, or prioritizing the print time over the print costs. The priority setting is stored in the flash memory 14.

For example, when the priority setting is set that prioritizes the print costs over the print time, the CPU 11 refers to a print cost field in the color gamut table shown in FIG. 5, and identifies, as the first alternative print setting-based first alternative color gamut, the color gamut corresponding to the print cost having the lowest amount, among the plurality of color gamuts.

For example, when the priority setting is set that prioritizes the print time over the print costs, the CPU 11 refers to a print time field in the color gamut table shown in FIG. 5, and identifies, as the first alternative print setting-based first alternative color gamut, the color gamut corresponding to the print time having the shortest length, among the plurality of color gamuts.

As shown in FIG. 2, the CPU 11 updates the display content of the color setting screen 30 on the basis of the identification results at step S16 and step S21 (step S22). At a time point at which step S22 is performed, the target print settings are stored in the flash memory 14 as the print settings. In the example shown in FIG. 3, at the time point at which step S22 is performed, "No base" and "Low resolution" are set as the target print settings. At step S22, the CPU 11 displays the Lab values (48.6, 52.8, 2.5) in the Lab display region 331 and displays the color corresponding to (48.6, 52.8, 2.5) on the Lab-correspondence icon 333. The CPU 11 displays the RGB values (225, 16, 128) in the RGB display region 332 and displays the color corresponding to the RGB values (225, 16, 128) in the sRGB color space on the RGB-correspondence icon 334.

The CPU 11 displays, in the color difference display region 34, the distance (7.7) between the specified color-based device-independent color (50, 60, 0) and the Lab values (48.6, 52.8, 2.5) of the neighboring color. The CPU 11 displays "Outside color gamut." in the determination result display region 35. "Outside color gamut." indicates that the determination result at step S17 shows that the specified color-based device-independent color (50, 60, 0) is not present within the target print setting-based target color gamut (the color gamut C1).

The CPU 11 displays "Can be reproduced if set to high resolution." in the alternative print setting display region 36. "Can be reproduced if set to high resolution." indicates that, by changing the low resolution (the target print settings) to the high resolution (the first alternative print settings), the printer 1 can reproduce the specified color using a color in the print setting-based color gamut. In other words, by changing the print settings from the target print settings to the first alternative print settings, the printer 1 can cause a print color to become closer to the specified color.

The CPU 11 displays the first alternative print settings identified at step S21 in the alternative print setting display region 36. As a result, in addition to the example shown in FIG. 3, depending on the identified first alternative print settings, the CPU 11 can display, in the alternative print setting display region 36, for example, a setting to perform the second pretreatment processing, and a setting to increase the base ink from the target print settings.

The CPU 11 displays the RGB values (192, 71, 103) of the first alternative color in the RGB display region 371. When the print settings have been changed to the first alternative print settings, the first alternative color is the RGB values for printing the specified color using the printer 1. The CPU 11 displays the color corresponding to the RGB values (192, 71, 103) on the RGB-correspondence icon 372.

As shown in FIG. 2, the CPU 11 determines whether a command has been input to change the print settings from the target print settings to the first alternative print settings (step S23). The user operates the operation portion 28 and inputs, to the printer 1, one of a command to change the print settings from the target print settings to the first alternative print settings, or a command to not change the print settings from the target print settings to the first alternative print settings.

When the command has been input to not change the print settings from the target print settings to the first alternative print settings (no at step S23), the CPU 11 shifts the processing to step S41, without changing the print settings. When the command has been input to change the print settings from the target print settings to the first alternative print settings (yes at step S23), the CPU 11 changes the print settings in the flash memory 14 from the target print settings to the first alternative print settings (step S24). The CPU 11 shifts the processing to step S41.

When the specified color-based device-independent color is present within the target color gamut (yes at step S17), the CPU 11 identifies the second alternative print settings (step S31). The second alternative print settings are print settings that are different from the target print settings. The second alternative print settings are print settings in which the specified color-based device-independent color is present within a second alternative print setting-based second alternative color gamut.

At step S31, the CPU 11 refers to the color gamut table shown in FIG. 5, and identifies, of the color gamuts C1 to C6, the color gamuts other than the target color gamut. Of the identified plurality of color gamuts, the CPU 11 identifies the color gamut in which the specified color-based device-independent color is present. The CPU 11 identifies, as the second alternative print settings, the print settings corresponding to the identified color gamut.

FIG. 6 shows the LCh values after converting the Lab values (50, 20, 0) as a point A2. The point A2 is present within the color gamut C4, and is also present within the color gamut C1. Thus, in the example shown in FIG. 4, the CPU 11 identifies, as the second alternative print settings (refer to FIG. 5), the print settings corresponding to the color gamut C1 (low resolution and no base ink).

For example, there is the case in which the specified color-based device-independent color is present within the plurality of color gamuts. In this case, the CPU 11 identifies, as the second alternative print setting-based second alternative color gamut, one color gamut from among the plurality of color gamuts, depending on the priority setting. For example, when the priority setting is set that prioritizes the print costs over the print time, the CPU 11 refers to the print cost field in the color gamut table shown in FIG. 5, and identifies, as the second alternative print setting-based second alternative color gamut, the color gamut corresponding to the print cost having the lowest amount, among the plurality of color gamuts. For example, when the priority setting is set that prioritizes the print time over the print costs, the CPU 11 refers to the print time field in the color gamut table shown in FIG. 5, and identifies, as the second alternative print setting-based second alternative color gamut, the color gamut corresponding to the print time having the shortest length, among the plurality of color gamuts.

As shown in FIG. 2, the CPU 11 updates the display content of the color setting screen 30 on the basis of the identification results at step S16 and step S31 (step S32). At a time point at which step S32 is performed, the target print settings are stored in the flash memory 14 as the print settings. In the example shown in FIG. 4, at the time point at which step S32 is performed, "No base" and "High resolution" are set as the target print settings. At step S32, the CPU 11 displays the Lab values (49.8, 20.3, −0.4) in the Lab display region 331 and displays the color corresponding to (49.8, 20.3, −0.4) on the Lab-correspondence icon 333. The CPU 11 displays the RGB values (148, 77, 92) in the RGB display region 332 and displays the color corresponding to the RGB values (148, 77, 92) in the sRGB color space on the RGB-correspondence icon 334.

The CPU 11 displays, in the color difference display region 34, the distance (0.54) between the specified color-based device-independent color (50, 20, 0) and the Lab values (49.8, 20.3, −0.4) of the neighboring color. The CPU 11 displays "Inside color gamut." in the determination result display region 35. "Inside color gamut." indicates that the determination result at step S17 shows that the specified color-based device-independent color (50, 20, 0) is present within the target print setting-based target color gamut (the color gamut C4).

The CPU 11 displays "Can be reproduced even at low resolution." in the alternative print setting display region 36. "Can be reproduced even at low resolution." indicates that, even if the high resolution (the target print settings) is changed to the low resolution (the second alternative print settings), the printer 1 can reproduce the specified color using a color in the print setting-based color gamut. In other words, even if the print settings are changed from the target print settings to the second alternative print settings, the printer 1 can suppress the print color from becoming distant from the specified color.

The CPU 11 displays the identified second alternative print settings in the alternative print setting display region 36. As a result, in addition to the example shown in FIG. 4, depending on the identified second alternative print settings, the CPU 11 can display, in the alternative print setting display region 36, for example, a setting to not perform the second pretreatment processing, and a setting to reduce the amount of the base ink from the target print settings.

The CPU displays the RGB values (171, 77, 99) of the second alternative color in the RGB display region 371. When the print settings have been changed to the second alternative print settings, the second alternative color is the RGB values for printing the specified color using the printer 1. The CPU 11 displays the color corresponding to the RGB values (171, 77, 99) on the RGB-correspondence icon 372.

The CPU 11 determines whether a command has been input to change the print settings from the target print settings to the second alternative print settings (step S33). The user operates the operation portion 28 and inputs, to the printer 1, one of a command to change the print settings from the target print settings to the second alternative print settings, or a command to not change the print settings from the target print settings to the second alternative print settings.

When the command has been input to not change the print settings from the target print settings to the second alternative print settings (no at step S33), the CPU 11 shifts the processing to step S41, without changing the print settings. When the command has been input to change the print settings from the target print settings to the second alternative print settings (yes at step S33), the CPU 11 changes the print settings in the flash memory 14 from the target print settings to the second alternative print settings (step S34). The CPU 11 shifts the processing to step S41.

The CPU 11 creates the print data for printing the color that has been set (S41). When, for example, the print settings are the target print settings without change, the CPU 11 creates the print data for printing the neighboring color. When, for example, the print settings have been changed from the target print settings to the first alternative print settings, the CPU 11 creates the print data for printing the first alternative color. When, for example, the print settings have been changed from the target print settings to the second alternative print settings, the CPU 11 creates the print data for printing the second alternative color. The CPU 11 ends the main processing.

As described above, the CPU 11 acquires the specified color (step S12). The CPU 11 determines whether the specified color-based device-independent color is present in the target color gamut based on the target print settings of the printer 1 (step S17). When it is determined that the device-independent color is present within the target color gamut (yes at step S17), the CPU 11 displays the second alternative print settings of the printer 1 (step S32). The second alternative print settings are different from the target print settings. The specified color-based device-independent color is present in the second alternative print setting-based second alternative color gamut.

Accordingly, in the processing at step S32, the CPU 11 displays the second alternative print settings. In this way, the printer 1 can present the user with options for the second alternative print settings as an alternative to the target print settings. Since the specified color-based device-independent color is present in the second alternative print setting-based second alternative color gamut, the print color is suppressed from becoming distant from the specified color even when using the second alternative print settings. Thus, the printer 1 can present the user with options for the second alternative print settings, as an alternative to the target print settings, while suppressing the print color from becoming distant from the specified color.

When it is determined that the specified color-based device-independent color is present in the target print setting-based target color gamut, the CPU 11 displays the second alternative print settings (step S32). The print time by the printer 1 is shorter using the second alternative print settings than when using the target print settings. The print costs by the printer 1 are lower using the second alternative print settings than when using the target print settings.

According to the above, the printer 1 can present options to the user for the second alternative print settings, as an alternative to the target print settings, with which, while suppressing the print color from becoming distant from the specified color, the print time by the printer 1 is shorter than when using the target print settings, and further, the print costs by the printer 1 are lower than when using the target print settings.

The CPU 11 determines, on the basis of the target print settings, whether the device-independent color based on the specified color is present within the target color gamut based on the target print settings of the printer 1 (step S17). The target print settings include the print control settings. The print control settings relate to the control of the printer 1.

There is a possibility that the print control settings may have an influence on the size and shape of the print setting-based color gamut. The CPU 11 determines, on the basis of the print control settings, whether the specified color-based device-independent color is present in the target print setting-based target color gamut. In other words, the CPU 11 can determine whether the specified color-based device-independent color is present in the target print setting-based target color gamut, on the basis of the settings that can have an influence on the size and shape of the print setting-based color gamut.

On the basis of the target print settings, the CPU 11 determines whether the specified color-based device-independent color is present in the target color gamut based on the target print settings of the printer 1 (step S17). The target print settings include the processing conditions for the pretreatment processing. The pretreatment processing is performed before the application of the color inks by the printer 1.

There is a possibility that the processing conditions of the pretreatment processing may have an influence on the size and shape of the print setting-based color gamut. The printer 1 determines whether the specified color-based device-independent color is present in the target print setting-based target color gamut, on the basis of the processing conditions of the pretreatment processing. In other words, the printer 1 can determine whether the specified color-based device-independent color is present in the target print setting-based target color gamut, on the basis of the settings that can have an influence on the size and shape of the print setting-based color gamut.

The CPU 11 displays the second alternative print settings of the printer 1 (step S32). The second alternative print settings include a setting not to perform the application of the base ink by the printer 1, as the processing conditions of the pretreatment processing.

When the application of the base ink by the printer 1 is not performed, for example, the print time becomes shorter by an amount corresponding to the application, and printing costs are lowered. The printer 1 displays the second alternative print settings in the processing at step S32. The second alternative print settings include the setting to not perform the application of the base ink by the printer 1, as the processing conditions of the pretreatment processing. Thus, the printer 1 can present options to the user for the second alternative print settings with which it is possible to shorten the print time and reduce the print costs, as an alternative to the target print settings, while suppressing the print color from becoming distant from the specified color.

The CPU 11 displays the second alternative print settings of the printer 1 (step S32). The second alternative print settings include a setting to reduce the amount of the base ink, as the processing conditions of the pretreatment processing. The base ink is applied by the printer 1 as a base agent.

When the amount of the base ink is reduced, for example, the print costs are lowered by a corresponding amount. The printer 1 displays the second alternative print settings in the processing at step S32. The second alternative print settings include the setting to reduce the amount of the base ink, as the processing conditions of the pretreatment processing. Thus, the printer 1 can present options to the user for the second alternative print settings with which it is possible to reduce the print costs, as an alternative to the target print settings, while suppressing the print color from becoming distant from the specified color.

In the present disclosure, various modifications can be made to the above-described embodiment. Various modified examples explained below can be respectively combined insofar as contradictions do not arise. For example, in the above-described embodiment, the printer 1 may be a type other than the inkjet printer, and may be a laser printer, a tape printer, or the like. Some or all of the pretreatment head 5, the base head 6, the color head 7, and the post-treatment head 8 may be a line head.

In the above-described embodiment, some or all of a device for performing the first pretreatment processing (a device provided with the pretreatment head 5, for example), a device for performing the second pretreatment processing (a device provided with the base head 6, for example), and a device for preforming the post-treatment processing (a device provided with the post-treatment head 8, for example) may be provided separately from the printer 1.

The first pretreatment processing may include heat processing in place of, or in addition to, applying the pretreatment agent to the print medium by the printer 1. The post-treatment processing may include heat processing in place of, or in addition to, applying the post-treatment agent to the print medium by the printer 1. In the heat processing, the print medium is heated. In this way, for example, in the first pretreatment processing, excessive moisture is evaporated from the print medium and the print medium is dried, and in the post-treatment processing, the pretreatment agent, the ink, and the post-treatment agent applied to the print medium are cured.

As described above, when each of the heads is a line head, when the devices for performing the first pretreatment processing, the second pretreatment processing, and the post-treatment processing are separate from the printer 1, and when the first pretreatment processing, the second pretreatment processing, and the post-treatment processing include the heating processing, settings relating to these are also included in the print settings, such as the print control settings and the like.

In the above-described embodiment, the printer 1 performs all of the main processing. In contrast to this, as a color setting device, a device other than the printer 1 may perform some or all of the main processing. The color setting device is, for example, a personal computer (PC), a tablet terminal, or a smartphone, and performs mutual communication with the printer 1 in a wired or wireless format. When the color setting device performs all of the main processing, the color chart creation device transmits the print data to the printer 1. The printer 1 performs the printing on the basis of the print data received from the color setting device.

In the above-described embodiment, the configuration of the color setting screen 30 can be changed as appropriate. For example, on the color setting screen 30, the print setting selection region 31 may include a pretreatment setting selection region, a post-treatment setting selection region, and the like, in place of, or in addition to, the base setting selection region 311 and the resolution selection region 312.

The pretreatment setting selection region shows options for processing conditions of the first pretreatment processing, and shows, for example, a "No pretreatment processing" option, a "Small amount of pretreatment agent" option, and a "Large amount of pretreatment agent" option. The "No pretreatment processing" option shows a setting in which the first pretreatment processing is not performed. The "Small amount of pretreatment agent" option shows a setting in which the first pretreatment processing is performed, and a setting in which the amount of pretreatment agent used in the first pretreatment processing is a small amount. The "Large amount of pretreatment agent" option shows a setting in which the first pretreatment processing is performed, and a setting in which the amount of pretreatment agent used in the first pretreatment processing is a large amount. The post-treatment setting selection region shows options for processing conditions of the post-treatment processing, in a similar manner.

In the above-described embodiment, the method for identifying the target print setting-based target color gamut (step S15) is not limited to a particular method. For example, the CPU 11 may identify the target print setting-based target color gamut using a calculation formula, on the basis of the target print settings. The calculation formula is stored in the ROM 12 or the flash memory 14, and uses the content of some or all of the print control settings, the print medium settings and the ink settings as variables. For example, the CPU 11 identifies the target print setting-based target color gamut, by inputting values according to the content of the print control settings, the print medium settings, and the ink settings, which are set as the target print settings, as the variables in the calculation formula.

In the above-described embodiment, the color gamut table sets out the print-setting based color gamuts C1 to C6, in association with combinations of the resolution settings and the base ink settings, as the type of the print control settings. In contrast to this, the color gamut table may set out the print setting-based color gamuts, in association with some or all of the other print control settings, the print medium settings, or the ink settings. In other words, the CPU 11 may determine whether the specified color-based device-independent color is present within the target print setting-based target color gamut, on the basis of some or all of the print control settings, the print medium settings, or the ink settings, as the target print settings. For example, the color gamut table may set out the print setting-based color gamuts, in association with the settings of the processing conditions of the post-treatment processing, in place of or in addition to the base ink settings. In other words, the CPU 11 may determine whether the specified color-based device-independent color is present within the target print setting-based target color gamut, on the basis of the settings of the processing conditions of the post-treatment processing, in place of or in addition to the settings of the base ink, as the target print settings. The CPU 11 may determine whether the specified color-based device-independent color is present within the target print setting-based target color gamut, on the basis of print settings other than the print control settings, the print medium settings, and the ink settings, as the target print settings.

In the above-described embodiment, at step S22, the CPU 11 can display the first alternative print settings identified at step S21 in the alternative print setting display region 36. For example, the CPU 11 may display, in the alternative print setting display region 36, a setting to perform the first pretreatment processing, or a setting to increase the amount of the pretreatment agent. The CPU 11 may display a setting to increase the amount of the ink used in the print processing, such as a change from single printing to double printing, or the like. The CPU 11 may display a setting to change from bi-directional printing to uni-directional printing. The CPU 11 may display a setting of a non-conversion profile. In these cases, the first alternative print setting-based first alternative color gamut is likely to become larger than the target print setting-based target color gamut. For example, when the amount of ink and the amount of pretreatment agent are increased, the distance between the specified color-based device-independent color and the print setting-based color gamut is more likely to become smaller. Thus, by displaying the setting to increase the amount of the pretreatment agent, the printer 1 can present, to the user, options for print settings in which the print color comes closer to the specified color.

In the above-described embodiment, at step S32, the CPU 11 can display the second alternative print settings identified at step S31 in the alternative print setting display region 36. For example, the CPU 11 may display, in the alternative print setting display region 36, a setting to not perform the first pretreatment processing, or a setting to reduce the amount of the pretreatment agent. The CPU 11 may display a setting to decrease the amount of the ink used in the print processing, such as a change from double printing to single printing, or the like. The CPU 11 may display a setting to change from uni-directional printing to bi-directional printing. The CPU 11 may display a setting of a profile that can reduce the amount of ink. In these cases, the second alternative print settings can shorten the print time or reduce the print costs more than the target print settings. For example, when the amount of ink and the amount of pretreatment agent are decreased, the print costs are reduced proportionately. Thus, the printer 1 can present, to the user, options for the second alternative print settings that can reduce the print costs, in addition to the target print settings, while suppressing the print color from becoming distant from the specified color.

In the above-described embodiment, the CPU 11 may identify a plurality of the neighboring color of the color difference priority, the neighboring color of the hue priority, the neighboring color of the luminance priority, and the neighboring color of the chroma priority, and may display all of the identified neighboring colors in the neighboring color display region 33. In this case, it is sufficient that the user operates the operation portion 28 and selects one of the neighboring colors.

Figure 7:
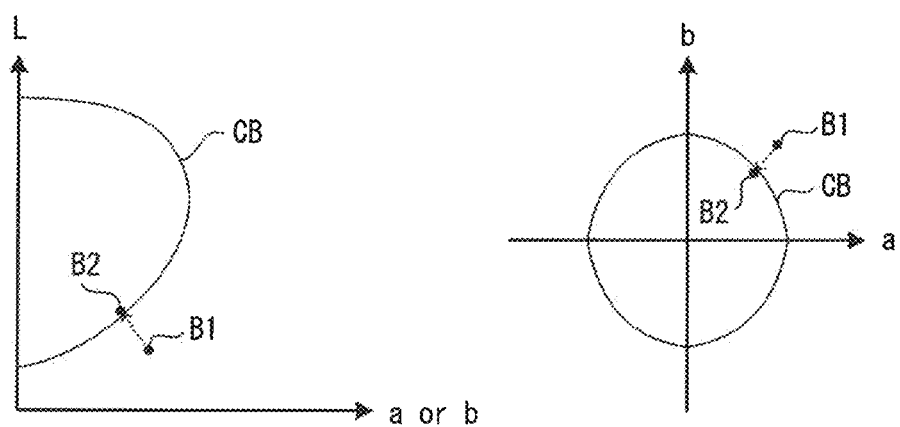
FIG. 7 is a diagram showing a color gamut graph.

The CPU 11 can change a display format of the neighboring color as appropriate. For example, at step S22 or step S32, the CPU 11 may display a color gamut graph shown in FIG. 7 on the color setting screen 30. As shown in FIG. 7, the color gamut graph shows the target print setting-based target color gamut as a color gamut CB, in the Lab color space. The color gamut graph shows the specified color-based device-independent color as a point B1. The color gamut graph shows the Lab values of the neighboring color as a point B2. The user can visually verify the color difference between the specified color and the neighboring color by looking at the color gamut graph. The CPU 11 may display CMYK values or the like as the neighboring color.

The CPU 11 may store the neighboring color in a color library used for converting a name of a color into predetermined values in a color space. The color library is provided in the flash memory 14, for example. In this case, the user can easily specify the neighboring color from the color library.

In the above-described embodiment, the example is explained of the case in which the single color is specified as the specified color. In contrast to this, there is a case in which the CPU 11 acquires an image at step S12, and the profile is specified in the acquired image. In this case, at step S12, the CPU 11 may scan the whole image, and may acquire, as the specified colors, all the colors of the scanned image. The CPU 11 may convert all of the colors acquired as the specified colors at step S13, as the specified color-based device-independent colors, and at step S17, may determine whether all of the specified color-based device-independent colors are in the target print setting-based target color gamut.

When some or all of the specified color-based device-independent colors are not present within the target print setting-based target color gamut, the CPU 11 performs the processing at step S21. In this case, for example, the CPU 11 may identify the first alternative print settings in which all of the specified color-based device-independent colors are present within the first alternative print setting-based first alternative color gamut. For example, the CPU 11 may identify the first alternative print settings in which a number of types of the specified color-based device-independent color present within the first alternative print setting-based first alternative color gamut is greater than a number of types of the specified color-based device-independent color in the target print setting-based target color gamut.

When all the specified color-based device-independent colors are present within the target print setting-based target color gamut, the CPU 11 performs the processing at step S31. In this case, for example, the CPU 11 may identify the second alternative print settings in which all of the specified color-based device-independent colors are present within the second alternative print setting-based second alternative color gamut.

In the above-described embodiment, the CPU 11 acquires the specified color as a result of the operation portion 28 being operated. In contrast to this, the user may operate an external device, for example, and the specified color may be input to the printer 1 from the external device by communication. The external device is, for example, a personal computer (PC), a tablet terminal, or a smartphone, and performs mutual communication with the printer 1 in a wired or wireless format.

In the above-described embodiment, the priority settings show whether to prioritize the print costs over the print time, or to prioritize the print time over the print costs. In contrast to this, the priority settings may show a priority ranking for the print control settings, the print medium settings, or the ink settings, and, more specifically, may show whether to prioritize the base ink settings over the resolution settings, whether to prioritize the resolution settings over the base ink settings, or the like. When there are the plurality of color gamuts in which the specified color-based device-independent color is present, at step S21, the CPU 11 identifies, as the first alternative print settings, the print settings in which the priority setting is higher, of the print settings corresponding to the plurality of color gamuts. In the example shown in FIG. 3, the target print setting-based target color gamut is the color gamut C1, and there is a case in which the color gamut C3 and the color gamut C4 are identified as the color gamut in which the specified color-based device-independent color is present. When the color gamut is changed from the color gamut C1 to the color gamut C3, the resolution setting does not change and is "Low resolution," while the base ink setting changes from "No base" to "Large amount." When the color gamut is changed from the color gamut C1 to the color gamut C4, the resolution setting changes from "Low resolution" to "High resolution," while the base setting does not change and is "No base." In this case, if the priority setting is set that prioritizes the resolution setting over the base ink setting, the CPU 11 identifies the color gamut C4 as the first alternative print setting-based first alternative color gamut.

In the above-described embodiment, at step S21, there is a case in which the first alternative print settings do not exist in which the distance between the specified color-based device-independent color and the target print setting-based target color gamut becomes "zero". In this case, the CPU 11 may identify, as the first alternative print setting-based first alternative color gamut, the color gamut, of each of the color gamuts C1 to C6, for which the distance from the specified color-based device-independent color to the color gamut is smallest. Alternatively, for example, the CPU 11 may display a message indicating that the first alternative print settings do not exist, in the alternative print setting display region 36. For example, the message indicating that the first alternative print settings do not exist is "Cannot be reproduced even with other print settings.".

In the above-described embodiment, when there are the plurality of color gamuts in which the specified color-based device-independent color is present, at step S21, the CPU 11 identifies one of the color gamuts from the plurality of color gamuts, as the first alternative print setting-based first alternative color gamut. In contrast to this, the CPU 11 may identify all of the plurality of color gamuts as the first alternative print setting-based first alternative color gamuts. In this case, at step S22, the CPU 11 may display the plurality of first alternative color gamuts in the alternative print setting display region 36.

In place of the CPU 11, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 12, the flash memory 14, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 12 or the flash memory 14. In this case, the control program may be stored in a non-transitory storage medium, such as an HDD provided in the server.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions that, when executed by a processor of a computer, instruct the computer to perform processes, the computer being configured to select print settings of a printer, the processes comprising:
   acquiring a specified color;
   determining whether a device-independent color that is based on the acquired specified color is present within a first color gamut that is based on first print settings of the printer, the first print settings being the print settings currently selected;
   identifying, when it is determined that the device-independent color is present within the first color gamut, second print settings of the printer, the second print settings being the print settings different from the first print settings and with which the device-independent color is present within a second color gamut that is based on the second print settings; and
   displaying the identified second print settings.

2. The non-transitory computer-readable medium storing the computer-readable instructions according to claim 1, wherein
the processes include identifying, when it is determined that the device-independent color is present within the first color gamut, the second print settings with which a print time by the printer is shorter than with the first print settings, or print costs by the printer are lower than with the first print settings.

3. The non-transitory computer-readable medium storing the computer-readable instructions according to claim 1, wherein
the processes include determining based on the first print settings whether the device-independent color is present within the first color gamut, the first print settings including at least one of print control settings relating to control of the printer, print medium settings relating to a print medium on which printing by the printer is performed, or ink settings relating to ink used in the printing by the printer.

4. The non-transitory computer-readable medium storing the computer-readable instructions according to claim 1, wherein
the processes include determining based on the first print settings whether the device-independent color is present within the first color gamut, the first print settings including processing conditions for at least one of pretreatment processing performed before application of color inks by the printer, or post-treatment processing performed after the application of the color inks by the printer.

5. The non-transitory computer-readable medium storing the computer-readable instructions according to claim 4, wherein
the processes include determining based on the first print settings whether the device-independent color is present within the first color gamut, the first print settings including the processing conditions for the pretreatment processing, and
the processes include identifying, when it is determined that the device-independent color is present within the first color gamut, the second print settings including a setting for not performing application of a base agent by the printer, as the processing condition for the pretreatment processing.

6. The non-transitory computer-readable medium storing the computer-readable instructions according to claim 5, wherein
the processes include identifying, when it is determined that the device-independent color is present within the first color gamut, the second print settings including a setting for reducing an amount of a base ink applied by the printer as the base agent, as the processing condition for the pretreatment processing.

7. The non-transitory computer-readable medium storing the computer-readable instructions according to claim 5, wherein
the processes include identifying, when it is determined that the device-independent color is present within the first color gamut, the second print settings including a setting for reducing an amount of a pretreatment agent applied by the printer as the base agent, as the processing condition for the pretreatment processing.

8. The non-transitory computer-readable medium storing the computer-readable instructions according to claim 1, wherein
the processes include identifying, when it is determined that the device-independent color is present within the first color gamut, the second print settings including a setting for reducing an amount of ink used in printing by the printer.

9. A color setting method by a computer configured to select print settings of a printer, the color setting method comprising:
acquiring a specified color;
determining whether a device-independent color that is based on the acquired specified color is present within a first color gamut that is based on first print settings of the printer, the first print settings being the print settings currently selected;
identifying, when it is determined that the device-independent color is present within the first color gamut, second print settings of the printer, the second print settings being the print settings different from the first print settings and with which the device-independent color is present within a second color gamut that is based on the second print settings; and
displaying the identified second print settings.

10. A color setting device configured to select print settings of a printer, the color setting device comprising:
a processor; and
a memory storing computer-readable instructions that, when executed by the processor, instruct the processor to perform processes comprising:
acquiring a specified color;
determining whether a device-independent color that is based on the acquired specified color is present within a first color gamut that is based on first print settings of the printer, the first print settings being the print settings currently selected;
identifying, when it is determined that the device-independent color is present within the first color gamut, second print settings of the printer, the second print settings being the print settings different from the first print settings and with which the device-independent color is present within a second color gamut that is based on the second print settings; and
displaying the identified second print settings.

11. A non-transitory computer-readable medium storing computer-readable instructions that, when executed by a processor of a computer, instruct the computer to perform processes comprising:
acquiring a specified color;
determining whether a device-independent color that is based on the acquired specified color is present within a first color gamut that is based on first print settings of a printer, the first print settings including processing conditions for pretreatment processing performed before application of color inks by the printer; and
displaying, when it is determined that the device-independent color is present within the first color gamut, second print settings of the printer, the second print settings being different from the first print settings and with which the device-independent color is present within a second color gamut that is based on the second print settings, the second print settings including a setting for not performing application of a base agent by the printer, as the processing condition for the pretreatment processing.

12. A color setting method comprising:
acquiring a specified color;
determining whether a device-independent color that is based on the acquired specified color is present within a first color gamut that is based on first print settings of a printer, the first print settings including processing conditions for pretreatment processing performed before application of color inks by the printer; and displaying, when it is determined that the device-independent color is present within the first color gamut, second print settings of the printer, the second print settings being different from the first print settings and with which the device-independent color is present within a second color gamut that is based on the second print settings, the second print settings including a setting for not performing application of a base agent by the printer, as the processing condition for the pretreatment processing.

13. A color setting device comprising:

a processor; and a memory storing computer-readable instructions that, when executed by the processor, instruct the processor to perform processes comprising:

acquiring a specified color; and determining whether a device-independent color that is based on the acquired specified color is present within a first color gamut that is based on first print settings of a printer, the first print settings including processing conditions for pretreatment processing performed before application of color inks by the printer; and displaying, when it is determined that the device-independent color is present within the first color gamut, second print settings of the printer, the second print settings being different from the first print settings and with which the device-independent color is present within a second color gamut that is based on the second print settings, the second print settings including a setting for not performing application of a base agent by the printer, as the processing condition for the pretreatment processing.

* * * * *